United States Patent
Becker et al.

(10) Patent No.: US 6,167,686 B1
(45) Date of Patent: Jan. 2, 2001

(54) TENSIONER FOR HEADER OF A HARVESTER

(75) Inventors: Klaus Ernst Becker, East Moline; Paul John McCredie, Milan, both of IL (US)

(73) Assignee: Deere & Company, Moline, IL (US)

( * ) Notice: Under 35 U.S.C. 154(b), the term of this patent shall be extended for 0 days.

(21) Appl. No.: 09/364,493

(22) Filed: Jul. 30, 1999

(51) Int. Cl.[7] ........................... A01D 34/03; A01D 34/43; A01D 34/64
(52) U.S. Cl. ............................................. 56/17.3; 474/109
(58) Field of Search .................... 56/11.2, 14.9, 56/15.6, 15.9, 16.1, 16.2, 17.3, DIG. 14, 341; 172/672, 683, 684, 776, 311, 310, 315; 474/29, 80, 109, 134, 138, 135

(56) References Cited

U.S. PATENT DOCUMENTS

| | | | |
|---|---|---|---|
| 1,257,660 | * | 2/1918 | Willis .................... 474/109 |
| 3,374,686 | * | 3/1968 | Brewer .................. 474/135 |
| 3,628,315 | * | 12/1971 | Bartholomew .......... 56/10.5 |
| 3,673,884 | * | 7/1972 | Southiere ............ 74/242.11 S |
| 4,069,719 | | 1/1978 | Cancilla ............ 74/242.11 B |
| 4,278,211 | * | 7/1981 | Shriver .................. 241/222 |
| 4,416,647 | | 11/1983 | White, Jr. .............. 474/134 |
| 4,439,171 | * | 3/1984 | Bergles .................. 474/80 |
| 4,504,250 | * | 3/1985 | Juy ........................ 474/80 |
| 4,511,348 | | 4/1985 | Witdoek et al. ........ 474/109 |
| 4,658,573 | * | 4/1987 | VanGinhoven .......... 56/341 |
| 4,713,042 | * | 12/1987 | Imhoff .................... 474/69 |
| 4,758,208 | * | 7/1988 | Bartos et al. .......... 474/135 |
| 4,768,997 | | 9/1988 | Page et al. .............. 474/84 |
| 4,838,840 | * | 6/1989 | Mutoh et al. .......... 474/138 |
| 4,934,989 | | 6/1990 | Furukawa et al. ...... 474/135 |
| 4,981,116 | * | 1/1991 | Trinquard ............ 123/90.31 |
| 5,221,236 | * | 6/1993 | Raymer et al. ........ 474/109 |
| 5,557,912 | * | 9/1996 | Voss et al. .............. 56/130 |
| 5,613,918 | | 3/1997 | Fleischman ............ 474/134 |
| 5,695,421 | * | 12/1997 | Fukuda .................. 474/82 |
| 5,730,670 | * | 3/1998 | Ferrarin ................ 474/79 |
| 5,778,644 | * | 7/1998 | Keller et al. ............ 56/11.2 |
| 5,924,947 | * | 7/1999 | Williams ................ 474/133 |
| 5,964,674 | * | 10/1999 | Serkh et al. .......... 474/109 |

* cited by examiner

Primary Examiner—Robert E. Pezzuto
Assistant Examiner—Arpad Fabian Kovacs

(57) ABSTRACT

A chain or belt tensioner is provided in a header for a harvester having a pair of rollers, each supported on separate pivot arms and engagable with the slack and taut strands of the chain or belt. The pivot arms are mounted about a common pivot and are spring biased into engagement with the chain or belt by a common spring. When the drive direction is reversed, the normally slack side of the chain becomes taut and assumes a straight-line position between the sprockets or sheaves. The pivot arms will rotate about the pivot and the pivot arm on the strand that has now become slack will rotate to tension the slack strand. The biasing spring coupled to the two pivot arms biases the rollers against the two strands of the chain and provides a fixed tensioning force on the chain that does not require adjustment.

4 Claims, 5 Drawing Sheets

TENSIONER FOR HEADER OF A HARVESTER

BACKGROUND OF THE INVENTION

1. Field of the Invention

The present invention generally relates to the header of a harvester and in particular to a tensioner for a chain or belt drive for rotating components of the header.

2. Description of the Related Art

Headers for harvesters, such as a combine, typically have a crop cutting and gathering apparatus that removes a portion of the crop for subsequent processing by the harvester. The type of crop cutting and gathering apparatus varies from among header types. A platform has a cutterbar at the front and a reel to hold the crop against the cutterbar. A corn head is equipped with snapping rollers and deck plates to remove the ears of corn and gathering chains to move the ears rearward. Row crop headers have mating serpentine belts to gather and hold the crop and rotary knives to cut the crop. Once the crop has been cut, a conveying or transport device moves the crop laterally of the header to an outlet opening through which the crop moves into the feederhouse of the combine or onto the ground. The conveying device can be a crop converging auger or a draper belt.

Crop-conveying augers are typically mechanically driven from a power takeoff on the harvester. A drive shaft extending laterally along the rear of the header is coupled to the auger via a drive train having an endless flexible member, typically a chain, wrapped around sprockets. An idler engages the slack side of the chain to tension the slack side. The idler is typically in the form of a sprocket that is adjustably mounted to the header frame and is set in position to provide the desired tension. However, during operation of the header it may be necessary to reverse the direction of the auger drive train to remove a blockage of the cut crop. When this occurs, the normally slack strand of the chain now becomes the taut strand. This greatly increases the load applied to the idler. As a result, the idler must be designed with the additional load carrying capability required during the occasional reversing of the drive train direction. This adds significant cost to the frame and the idler support.

SUMMARY OF THE INVENTION

Accordingly, it is an object of the present invention to provide a header chain tensioner that can accommodate the reversal in the drive direction without requiring additional strength over and above what is necessary for normal operation.

It is a feature of the present invention to provide a pair of idler rollers, each supported on a pivot arm and engagable with the slack and taut strands of the chain. The pivot arms are mounted about a common pivot and are spring biased into engagement with the chain by a common spring. When the normally slack side of the chain becomes taut and assumes a straight-line position between the drive sprocket and the driven sprocket, the pivot arms will rotate about the pivot. The pivot arm on the normally taut strand, that has now become slack, will rotate to tension the now slack strand. A spring operatively coupled to the two pivot arms urges the tensioning rollers against the two strands of the chain and provide a fixed tensioning force on the chain that does not require adjustment. Alternatively, the two pivot arms can be adjustably fixed to one another by a bolt and nut assembly to provide an adjustable tensioning force on the chain.

The pivot supporting the two pivot arms of the chain tensioner can also be used to pivotally support an idler for an additional drive train if necessary. A harvesting platform typically includes a belt drive for a cutterbar at the front of the platform. The cutterbar can be driven by the same input drive shaft having a sheave thereon adjacent to the sprocket for the auger drive train. The belt extends to a sheave on the knife drive gearbox and has an idler to provide tension to the drive belt. By mounting the belt idler to the same pivot supporting the chain tensioner pivot arms, the number of mounting connections to the platform frame can be reduced.

While the invention is shown in the context of a platform having a cutterbar as the crop collecting apparatus, the tensioner can be used in other headers including corn heads having snapping rollers to remove the ears. In addition, while the tensioner is shown in the context of a chain drive, the tensioner can by used with a belt drive or other drive train having an endless member.

DESCRIPTION OF THE PREFERRED EMBODIMENT

Figure 1:
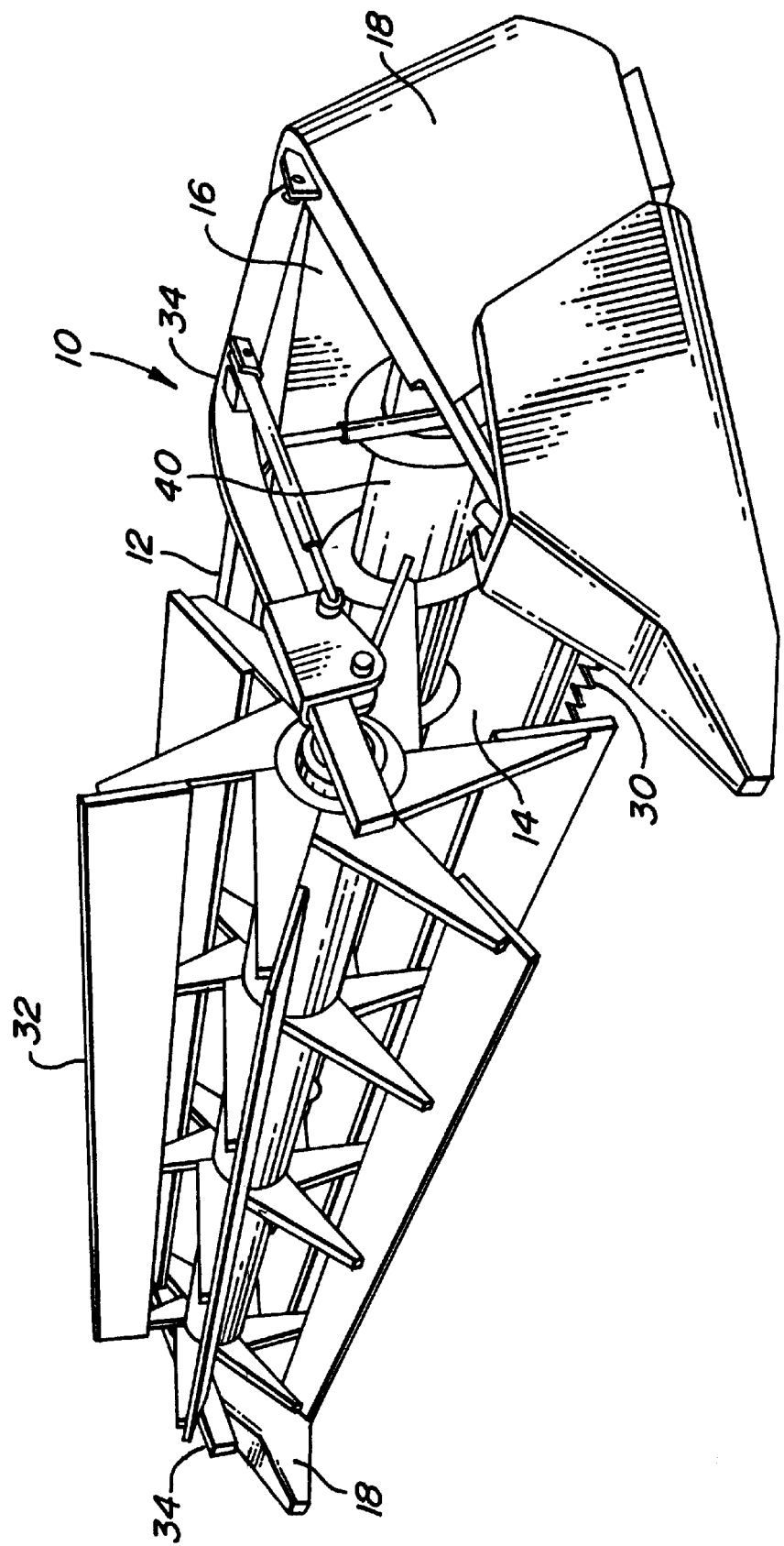
FIG. 1 a perspective view of a typical platform for a combine having the tensioner of the present invention.

The chain tensioner of the present invention is embodied in a platform 10 shown in FIG. 1. The platform 10 includes a frame generally indicated at 12, a floor 14, a rear wall 16 and sidesheets 18 (FIG. 2) at opposite ends of the platform. A cutterbar 30 is provided at the forward edge of the floor 14 for cutting the crop. A reel 32 rotates above the cutterbar to hold crop material against the cutterbar.

The reel 32 is mounted to the platform frame on a pair of reel support arms 34 in a conventional manner. Once the crop has been cut by the cutterbar 30, a crop conveying auger 40 moves the crop laterally of the platform to a central rear opening (not shown) to direct the cut crop into the feederhouse of an associated combine.

With reference to FIGS. 2–5, the drive train for rotating the auger 40 is shown in greater detail. The platform frame 12 includes a lower rear cross tube 44 and an end panel 20 coupled to the cross tube. A drive shaft 46 (FIG. 4) extends laterally behind the rear wall 16 and through the end panel 20. A drive train 48 couples the input drive shaft 46 to an auger shaft 49 (FIG. 4) to rotate the auger. The drive train 48 includes a first power transfer member, in the form of a sprocket 50, coupled to the input drive shaft 46. A second power transfer member, in the form of a sprocket 52, is coupled to the auger shaft. An endless flexible member, in this case a chain 56, is wrapped around the sprockets 50 and 52 to transfer rotary power from the input drive shaft 46 to the auger shaft 49.

Figure 2:
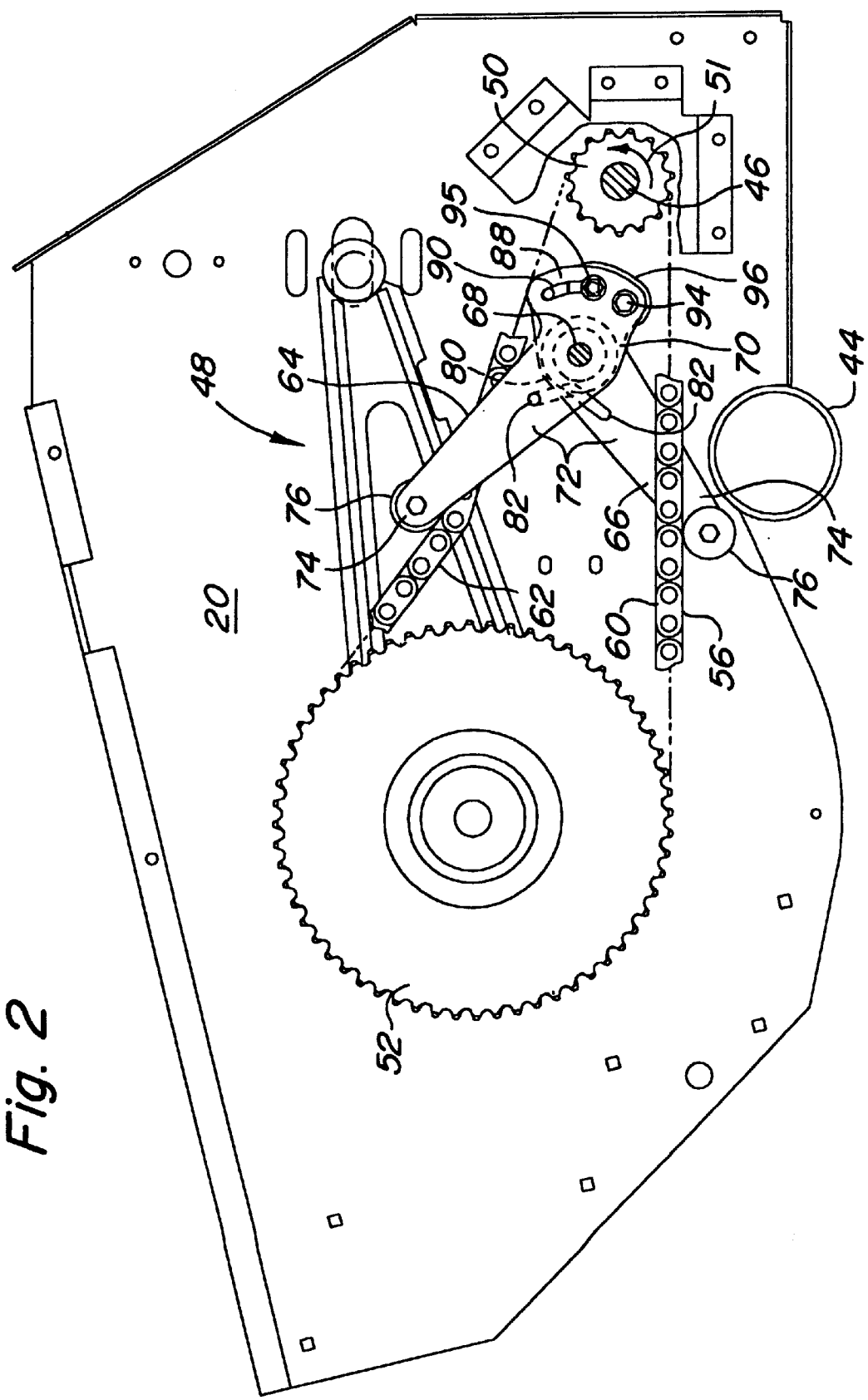
FIG. 2 is a side view of the chain tensioner of the present invention illustrating the chain in the normal drive direction.

During normal operation, the sprocket 50 rotates in a counter clockwise direction as viewed in FIG. 2 and shown by the arrow 51. The lower strand 60 of the chain 56 is normally taut while the upper strand 62 is normally slack.

The tensioner of the present invention includes a pair of upper and lower pivot arms 64, 66 both mounted to a pivot 68 extending from the end panel 20. The pivot arms are mounted to the pivot at a center portion 70 of each pivot arm. Each pivot arm has a radial extension 72 that extends outward from the central portion 70 and terminates at a distal end 74. A roller 76, preferably made of plastic, is rotatably mounted to each pivot arm at the distal end 74 of the radial extension 72. A torsion spring 80 is wrapped around the pivot 68 and has opposite ends 82 inserted through apertures 84 in each of the pivot arms. The spring 80 urges the pivot arms to press the two rollers 76 against the strands 60, 62 of the chain.

During normal operation, the tension in the taut strand of the chain will maintain the taut strand 60 to a straight-line position, tangent to the sprockets 50 and 52. The torsion spring 80 will bias the upper pivot arm 64 downward against the slack strand 62 to produce tension in the strand 62. The tension is controlled by the force of the torsion spring 80. No adjustment of the tensioning force is needed.

Figure 3:
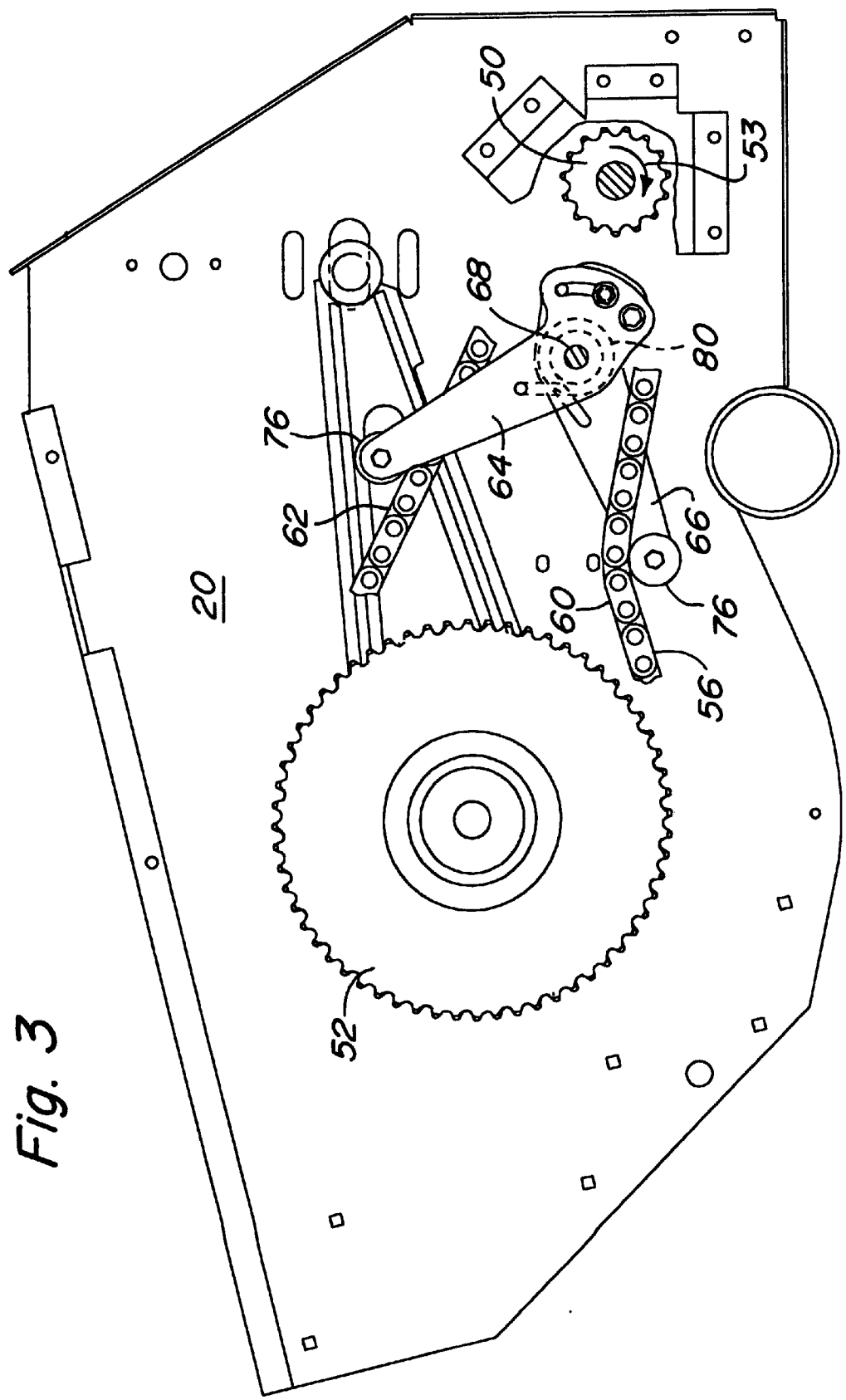
FIG. 3 is a side view of the chain tensioner of the present invention illustrating the chain in the reverse drive direction.
Figure 4:
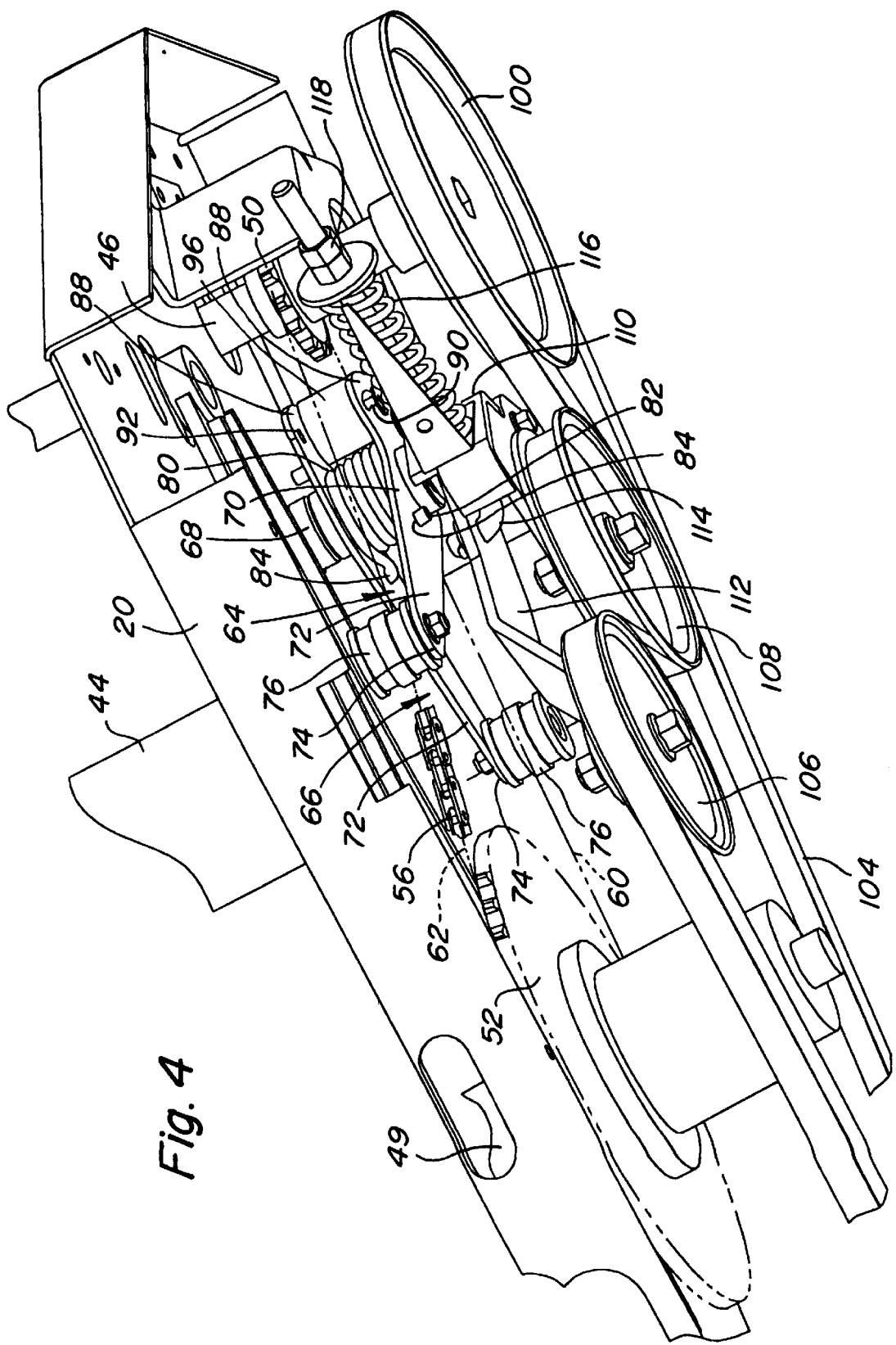
FIG. 4 is a top perspective view of the end of the header showing the chain tensioner of the present invention and the knife drive associated therewith.
Figure 5:
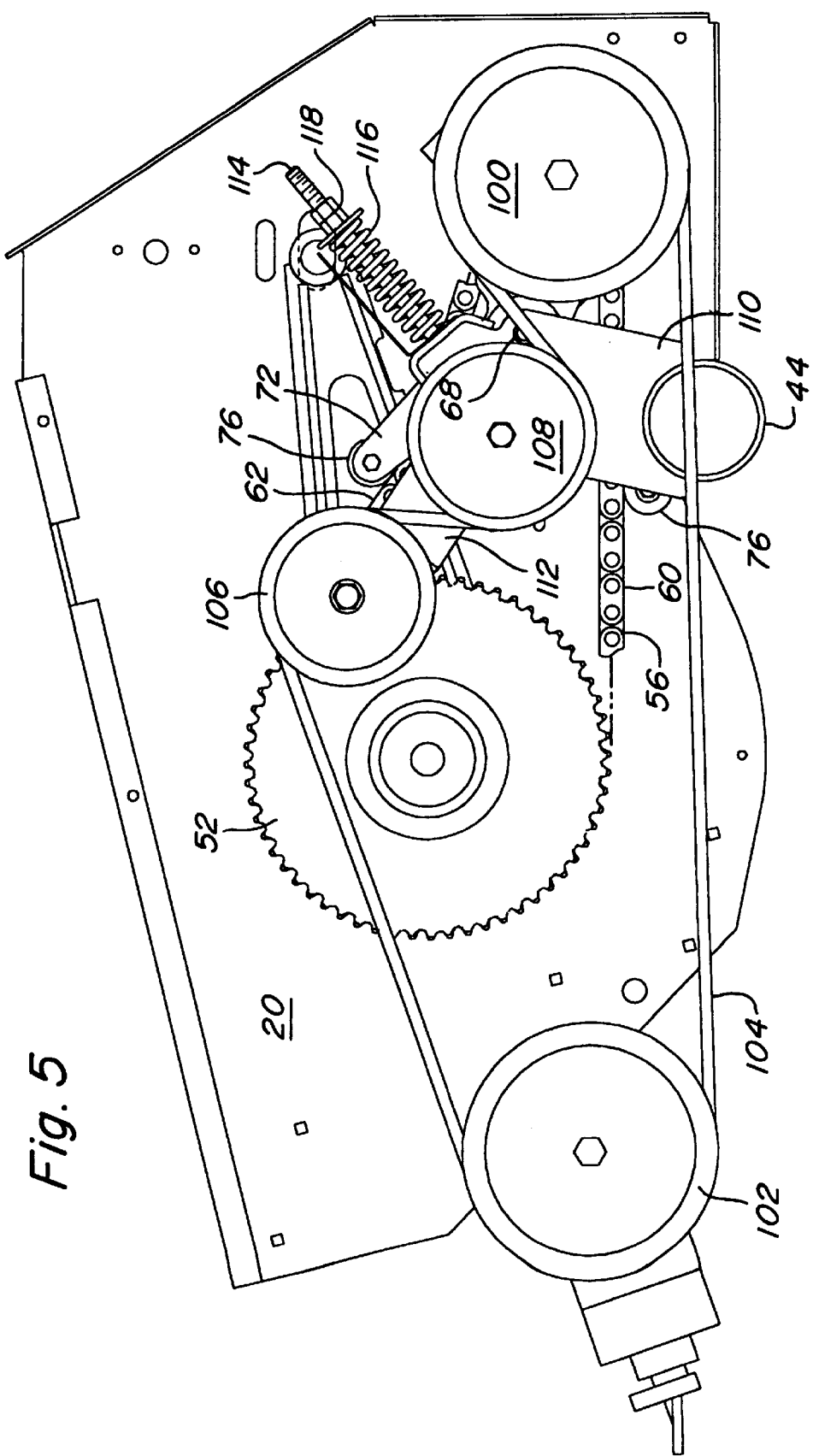
FIG. 5 is a side view of the header showing the chain tensioner and the associated knife drive.

When the drive direction is reversed as shown in FIG. 3 by the arrow 53, the upper strand 62 becomes the taut strand and the lower strand 60 becomes the slack strand. This will cause the upper strand 62 to assume a straight-line position tangent to the sprockets, causing the upper pivot arm 64 to rotate upward. The torsion spring 80 rotates the lower pivot arm 66 upward against the now slack lower strand of the chain, to produce tension in the lower strand. In this manner, the chain tensioner will always produce a tension in the slack strand of the chain and avoid a condition of overloading that occurs with a fixed chain tensioner acting only on one side of the chain.

The pivot arms 64, 66 also include a second radial extension 88. The radial extension 88 includes an arcuate slot 90 generally concentric about the pivot 68 and an aperture 92, which is at the same radial distance from the pivot 68 as the slot 90. A pin, in the form of a nut and bolt fastener 94, is inserted through the aperture 92 of one pivot arm and the slot 90 of the other. The pin limits the rotation of the pivot arms relative to one another to the extent of the slot 90. This is primarily an aid during assembly to limit movement of the pivot arms before the chain is placed on the sprockets. In the preferred embodiment shown, the two pivot arms 64, 66 are identical to one another.

As described above, the two pivot arms 64, 66 are separately rotatable about the pivot 68 and are coupled to each other through the torsion spring 80 to provide the tensioning force. This results in a tensioner that does not require adjustment. The desired tensioning force is provided by the spring 80. In an alternative embodiment, the nut and bolt fastener 94 can be used to join the two pivot arms to one another after the spread between the two rollers 76 has been adjusted to produce a desired chain tension.

A bushing 96 surrounds the nut and bolt assembly 94 between the two pivot arms and is held in place by a second nut and bolt assembly 95. The bushing 96 is engagable with the chain 56 to insure that the chain does not contact the torsion spring 80. The bushing 96 is necessary in the embodiment shown due to the close proximity of the pivot 68 to the sprocket 50 and the small diameter of the sprocket 50.

In the embodiment of the header shown, the cutterbar 30 is also driven by the input drive shaft 46. Another power transfer member, in the form of a sheave 100, is coupled to the input drive shaft 46. A belt 104 is wrapped around the sheave 100 and a sheave 102 on the cutterbar drive box. The belt 104 is also wrapped around a pair of idler rollers 106 and 108. The roller 108 is rotatably mounted to a frame bracket 110 that is in turn secured to the cross tube 44. The idler roller 106 is a tensioning idler and is mounted to a third pivot arm 112 that is also carried by the pivot 68. A rod 114 is coupled to the pivot arm 112 and passes through a spring 116 to tension the idler roller 106. A nut and washer assembly 118 threaded into the rod 114 is used to adjust the compression of the spring 116.

Utilizing the same pivot 68 for both the chain tensioner and the belt tensioner reduces cost by eliminating one pivot attachment to the end panel 20. The tensioner of the present invention provides additional benefits in limiting the forces applied to the tensioner to the force produced by the torsion spring 80. Thus, the tensioner components do not need to be strengthened for those instances when the drive direction is reversed.

While the tensioner has been described for use with the drive train for the crop conveying device, the tensioner can be used in the drive train for the crop cutting and gathering apparatus. The invention should not be limited to the above-described embodiment, but should be limited solely by the claims that follow.

What is claimed is:

1. A header for a harvesting machine comprising:

a frame having an end panel at one end thereof;

a cutterbar;

a rotating crop conveying auger;

a drive train for delivering rotational power to the auger, the drive train including an input drive shaft extending through the end panel and having a first sprocket affixed to a distal end thereof, an auger shaft coupled to the auger and extending through the end panel with a second sprocket affixed to a distal end thereof and an endless drive member entrained between the first and second sprockets to transfer rotational power therebetween, the endless drive member having a normally taut strand and a normally slack strand extending between the first and second sprockets;

a tensioner engaging the endless drive member to maintain a desired tension therein, the tensioner including a first roller engaging one strand of the endless drive member, the first roller being carried by a first pivot arm mounted to the end panel for rotation on a pivot, a second roller engaging the other strand of the endless drive member, the second roller being carried by a second pivot arm also mounted to the end panel for rotation on the pivot and a spring coupled to the first and second pivot arms to urge the rollers against the respective strands of the endless drive member to apply tension to the slack strand whereby when the direction of rotation of the input drive shaft is changed and the normally taut strand becomes slack and the normally slack strand becomes taut, the first and second pivot arms rotate about the pivot to tension the now slack strand, the first pivot arm having an arcuate slot that is concentric about the pivot and spaced from the pivot a predetermined distance and the second pivot arm having an aperture radially spaced from the pivot the predetermined distance; and a pin extending through the slot in the first pivot arm and the aperture in the second pivot arm wherein the slot defines the extent of rotation of the first pivot arm relative to the second pivot arm.

2. The header as defined by claim 1 wherein the first and second pivot arms are identical pieces with each pivot arm having an arcuate slot and an aperture and further comprising a pair of pins with each pin extending through the aperture in one pivot arm and the slot in the other pivot arm.

3. The header as defined by claim 2 wherein the first and second pivot arms are axially spaced from one another on the pivot and further comprising a bushing between the first and second pivot arms through which the pins extend.

4. A header for a harvesting machine comprising:

a frame having an end panel at one end thereof;

a cutterbar;

a rotating crop conveying auger;

a drive train for delivering rotational power to the auger, the drive train including an input drive shaft extending through the end panel and having a first sprocket affixed to a distal end thereof, an auger shaft coupled to the auger and extending through the end panel with a second sprocket affixed to a distal end thereof and a first endless drive member entrained between the first and second sprockets to transfer rotational power therebetween, the first endless drive member having a normally taut strand and a normally slack strand extending between the first and second sprockets;

a tensioner engaging the first endless drive member to maintain a desired tension therein, the tensioner including a first and second pivot arms rotatably mounted to the end panel on a pivot, each pivot arm having a roller engaging opposite strands of the first endless drive member, and a spring coupled to the first and second pivot arms to urge the rollers against the respective strands of the first endless drive member to apply tension to the slack strand whereby when the direction of rotation of the input drive shaft is changed and the normally taut strand becomes slack and the normally slack strand becomes taut, the first and second pivot arms rotate about the pivot to tension the now slack strand; and a second drive train for driving the cutterbar including first and second sheaves, a second endless drive member entrained around the sheaves, an idler roller engaging the second endless drive member, a third pivot arm supporting the idler roller and being rotatably carried by the end panel on the pivot and a spring to urge the idler roller against the second endless drive member to tension the second endless drive member.

* * * * *